United States Patent
Kruglick

(10) Patent No.: US 10,409,350 B2
(45) Date of Patent: Sep. 10, 2019

(54) INSTRUCTION OPTIMIZATION USING VOLTAGE-BASED FUNCTIONAL PERFORMANCE VARIATION

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 130 days.

(21) Appl. No.: 15/128,895

(22) PCT Filed: Apr. 4, 2014

(86) PCT No.: PCT/US2014/032941
§ 371 (c)(1),
(2) Date: Sep. 23, 2016

(87) PCT Pub. No.: WO2015/152939
PCT Pub. Date: Oct. 8, 2015

(65) Prior Publication Data
US 2017/0108908 A1  Apr. 20, 2017

(51) Int. Cl.
*G06F 1/32* (2019.01)
*G06F 1/28* (2006.01)
(Continued)

(52) U.S. Cl.
CPC .............. *G06F 1/28* (2013.01); *G06F 1/3203* (2013.01); *G06F 1/324* (2013.01); *G06F 1/3296* (2013.01);
(Continued)

(58) Field of Classification Search
CPC .................. G06F 1/28; G06F 1/3296
(Continued)

(56) References Cited

U.S. PATENT DOCUMENTS 5,493,684 A * 2/1996 Gephardt .............. G06F 1/3203
713/321
5,828,868 A * 10/1998 Sager ...................... G06F 1/08
713/501
(Continued)

FOREIGN PATENT DOCUMENTS

CN   103119536   5/2013
CN   103189814   7/2013
(Continued)

OTHER PUBLICATIONS

Extended European Search Report for European Patent Application No. 14888153.5, dated Oct. 10, 2017, pp. 13.
(Continued)

*Primary Examiner* — Volvick Derose

(57) ABSTRACT

The present disclosure generally relates to instruction optimization (or otherwise improved execution of instructions) using voltage-based functional performance variation. In some examples, a method is described that includes instruction optimization (or otherwise improved execution of instructions) using voltage-based functional performance variation. In some examples, the method includes characterizing a workload for a multi-core processor to identify one or more subunits of individual cores of the multi-core processor for utilization by instructions included in the workload, selecting a voltage at which to operate cores of the multi-core processor, and assigning individual ones of the instructions of the workload to a core of the cores of the multi-core processor based on performance of the identified one or more subunits of the individual cores at the selected voltage.

24 Claims, 6 Drawing Sheets

(51) Int. Cl.
| | |
|---|---|
| *G06F 1/3203* | (2019.01) |
| *G06F 1/324* | (2019.01) |
| *G06F 1/3296* | (2019.01) |
| *G06F 1/26* | (2006.01) |
| *G06F 1/30* | (2006.01) |

(52) U.S. Cl.
CPC .................. *G06F 1/26* (2013.01); *G06F 1/30* (2013.01); *Y02D 10/126* (2018.01); *Y02D 10/172* (2018.01)

(58) Field of Classification Search
USPC ........................................................ 713/320
See application file for complete search history.

(56) References Cited

U.S. PATENT DOCUMENTS

| | | | | |
|---|---|---|---|---|
| 8,738,860 | B1* | 5/2014 | Griffin | G06F 12/0897 711/122 |
| 9,104,485 | B1* | 8/2015 | Vincent | G06F 9/5027 |
| 2006/0005082 | A1 | 1/2006 | Fossum et al. | |
| 2006/0156040 | A1* | 7/2006 | Naveh | G06F 1/3203 713/300 |
| 2007/0245317 | A1* | 10/2007 | Hong | G06F 1/3203 717/130 |
| 2008/0162770 | A1 | 7/2008 | Titiano et al. | |
| 2010/0083009 | A1* | 4/2010 | Rotem | G06F 1/3203 713/300 |
| 2011/0154089 | A1* | 6/2011 | Wolfe | G06F 1/08 713/501 |
| 2011/0249744 | A1* | 10/2011 | Bailey | G06F 9/3891 375/240.16 |
| 2011/0271161 | A1* | 11/2011 | Kursun | G06F 11/24 714/736 |
| 2011/0296212 | A1* | 12/2011 | Elnozahy | G06F 1/3203 713/320 |
| 2012/0072746 | A1* | 3/2012 | Sotomayor | G06F 1/324 713/320 |
| 2012/0185867 | A1* | 7/2012 | Archer | G06F 9/5044 718/105 |
| 2012/0319965 | A1* | 12/2012 | Kurabayashi | G06F 9/5088 345/173 |
| 2012/0324250 | A1* | 12/2012 | Chakraborty | G06F 1/206 713/300 |
| 2013/0007762 | A1* | 1/2013 | Krishnamurthy | G06F 9/5044 718/104 |
| 2013/0013903 | A1* | 1/2013 | Bell, Jr. | G06F 15/7871 713/1 |
| 2013/0185570 | A1* | 7/2013 | Kumar | G06F 1/26 713/300 |
| 2013/0191817 | A1* | 7/2013 | Vorbach | G06F 8/4441 717/150 |
| 2013/0205126 | A1* | 8/2013 | Kruglick | G06F 1/3296 713/1 |
| 2014/0059325 | A1* | 2/2014 | Morimoto | G06F 12/0893 712/42 |
| 2014/0068284 | A1* | 3/2014 | Bhandaru | G06F 1/26 713/300 |
| 2015/0113304 | A1* | 4/2015 | Kim | G06F 1/324 713/322 |
| 2015/0149800 | A1* | 5/2015 | Gendler | G06F 1/324 713/322 |

FOREIGN PATENT DOCUMENTS

| | | | |
|---|---|---|---|
| EP | 2731008 A1 * | 5/2014 | ............ G06F 8/458 |
| WO | 2015152939 A1 | 10/2015 | |

OTHER PUBLICATIONS

International Search Report and Written Opinion for PCT/US2014/032941 dated Nov. 25, 2014.
Fu, et al., "Feedback Thermal Control of Real-time Systems on Multicore Processors", Proceedings of the Tenth ACM International Conference on Embedded Software, pp. 113-122 (Oct. 2012).
Gilge, et al., "IBM System Blue Gene Solutions Blue Gene/Q Application Development", Redbooks, pp. 1-188 (Feb. 2013).
Intel, "Intel® Xeon® Processor 7500 Series Uncore Programming Guide", 146 pages (Mar. 2010).
Iyer, et al., "Power Efficiency of Voltage Scaling in Multiple Clock, Multiple Voltage Cores", IEEE/ACM International Conference on Computer Aided Design, pp. 379-386 (Nov. 2002).
Kadin, "Performance Driven Frequency/Voltage Planning for Multiple-Core Processors with Thermal Constraints", Thesis, pp. 1-55 (Apr. 2008).
Li, et al., "Operating System Support for Overlapping-ISA Heterogeneous Multi-core Architectures", The Sixteenth International Symposium on High-Performance Computer Architecture, pp. 1-12 (Jan. 2010).
Liang, et al., "ReVIVaL: A Variation-Tolerant Architecture Using Voltage Interpolation and Variable Latency", 35th International Symposium on Computer Architecture, pp. 191-202 (Jun. 2008).
Marculescu, et al., "Variability and Energy Awareness: a Microarchitecture-level Perspective", Proceedings. 42nd Design Automation Conference, pp. 11-16 (Jun. 2005).
Miller, et al., "Mitigating the Effects of Process variation in Ultra-low Voltage Chip Multiprocessors Using Dual Supply Voltages and Half-Speed Units", IEEE Computer Architecture Letters, vol. 11, Issue 2, pp. 45-48 (Dec. 2011).
Powell, et al., "Architectural Core Salvaging in a Multi-Core Processor for Hard-Error Tolerance", Proceedings of the 36th Annual International Symposium on Computer Architecture, pp. 93-104 (Jun. 2009).
Rotem, et al, "Power Management Architecture of the Second Generation Intel Core Microarchitecture: Formerly Codenamed Sandy Bridge", Hot Chips, pp. 1-33 (Aug. 2011).
Rotem, et al.. "Power-Management Architecture of the Intel Microarchitecture Code-Named Sandy Bridge", IEEE Micro, vol. 32, Issue 2, 8 pages (Feb. 2012).
Semeraro: et al., "Dynamic Frequency and Voltage Control for a Multiple Clock Domain Micrarchitecture", Proceedings. 35th Annual IEEE/ACM International Symposium Microarchitecture, pp. 356-367 (Nov. 2002).
Seok, et al., "CAS-FEST 2010: Mitigating Variability in Near-Threshold Computing", IEEE Journal on Emerging and Selected Topic in Circuits and Systems, vol. 1, Issue 1, pp. 42-49 (May 2011).
Sondag, et al., "Phase-guided Thread-to-core Assignment for Improved Utilization of Performance-asymmetric Multi-core Processors", ICSE Workshop on Multicore Software Engineering, 10 paes (May 2009).
Talpes, et al., "A Critical Analysis of Application-Adaptive Multiple Clock Processors", Proceedings of the 2003 International Low Power Electronics and Design, pp. 278-281 (Aug. 2003).
Teodorescu, et al., "Mitigating Parameter Variation with Dynamic Fine-Grain Body Biasing", 40th Annual IEEE/ACM International Symposium on Microarchitecture, 13 pages (Dec. 2007).
Youtube, "HC23-S9: Desktop CPUs", Accessed at https://www.youtube.com/watch?v=5aQ0ECZOrHU, Session 9, Hot Chips 23, 2 pages (Apr. 2012).

* cited by examiner

INSTRUCTION OPTIMIZATION USING VOLTAGE-BASED FUNCTIONAL PERFORMANCE VARIATION

CROSS-REFERENCE TO RELATED APPLICATION

This application is a U.S. National Stage filing under 35 U.S.C. § 371 of International Application No. PCT/US2014/032941, filed on Apr. 4, 2014, the contents of which are incorporated herein by reference in its entirety, for any purpose.

BACKGROUND

Unless otherwise indicated herein, the materials described in this section are not prior art to the claims in this application and are not admitted to be prior art by inclusion in this section.

As contemporary developments in low voltage computing have progressed, permissible thresholds and margins for operation of integrated circuits have significantly diminished. Near threshold computing, for example, may lower voltage levels to the point where formerly acceptable process variation in the fabrication of an integrated circuit design may now result in substantially divergent functional capabilities and tolerances.

Typically, in near threshold computing, such process variation may result in localized failures of subunits of processor cores. Under the same operating conditions, for example, an integer arithmetic unit of one core may fail while a translation lookahead buffer of another core may fail.

SUMMARY

Some example methods include characterizing a workload for a multi-core processor to identify one or more subunits of individual cores of the multi-core processor for utilization by instructions included in the workload. Example methods may further include selecting a voltage at which to operate cores of the multi-core processor. Example methods may further include assigning individual ones of the instructions of the workload to a core of the cores of the multi-core processor based on performance of the identified one or more subunits of the individual cores at the selected voltage.

Example methods may further include reading data indicative of the performance of the identified one or more subunits of the individual cores at the selected voltage from a non-volatile memory accessible to the multi-core processor.

In some example methods, the data indicative of the performance of the identified one or more subunits of the individual cores at the selected voltage may comprise data indicative of whether functional performance variation is enabled for the identified one or more subunits of the individual cores at the selected voltage.

In some example methods, the data indicative of whether functional performance variation is enabled for the identified one or more subunits of the individual cores at the selected voltage may comprise data indicative of a clock speed of certain subunits of the cores at the selected voltage In some example methods, characterizing a workload for a multi-core processor to identify one or more subunits of individual cores of the multi-core processor for utilization by instructions included in the workload may comprise determining a type of the identified instructions included in the workload, and assigning a weight to individual ones of the instructions based on the type of instruction.

Another example method includes operating a core of a multi-core processor at a first voltage. The method may further include generating a first vector, using the core of the multi-core processor, to indicate whether functional performance variation was enabled for individual ones of a plurality of subunits of the core at the first voltage. The method further may further include operating the core of the multi-core processor at a second voltage. The method may further include generating a second vector, using the core of the multi-core processor, to indicate whether functional performance variation was enabled for the individual ones of the plurality of subunits of the core at the second voltage. The method may further include operating the core of the multi-core processor at a second voltage. The method may further include storing the first and second vectors in a non-volatile memory associated with the multi-core processor.

In some example methods, storing the first and second vectors in the non-volatile memory associated with the multi-core processor may comprise storing the first and second vectors in a data structure.

In some example methods, storing the first and second vectors in the non-volatile memory associated with the multi-core processor may comprise storing a clock speed of the individual ones of the plurality of subunits of the core.

In some example methods, storing the first and second vectors in the non-volatile memory associated with the multi-core processor may comprise storing a table, the table comprising the first and second vectors.

In some example methods, generating a first vector, using the core of the multi-core processor, to indicate whether functional performance variation was enabled for individual ones of a plurality of subunits of the core at the first voltage may comprise generating the first vector to indicate whether functional performance variation was enabled for the individual ones of the plurality of subunits of the core at the first voltage and at a first temperature, and the method may further comprise generating a third vector to indicate whether functional performance variation was enabled for the individual ones of the plurality of subunits of the core at the first voltage and at a second temperature.

In some example methods, the first voltage may correspond to a first voltage-frequency pair and operating the core of the multi-core processor at the first voltage may comprise operating the core at a frequency of the first voltage-frequency pair, and the second voltage may correspond to a second voltage-frequency pair and operating the core of the multi-core processor at the second voltage may comprise operating the core at a frequency of the second voltage-frequency pair.

In some example methods, the first vector may include a plurality of binary values, each of the binary values indicative of whether functional performance variation was enabled for a respective subunit of the plurality of subunits.

In some example methods, the first vector may include a frequency.

In yet another example, a multi-core processor is provided. The multi-core processor may include a plurality of cores, wherein individual ones of the plurality of cores include subunits, the subunits configured for selectively enabled functional performance variation based on a voltage of operation. The multi-core processor may further include control logic coupled to the individual ones of the plurality of cores and configured to receive the voltage of operation and to receive, from a core of the plurality of cores, a vector indicative of which subunits have enabled functional performance variation at the voltage of operation, the control logic further configured to assign individual ones of a plurality of instructions to the plurality of cores, wherein individual ones of the plurality of instructions include an affinity for one or more of the cores based on the vector.

In some examples, a multi-core processor may further comprise a non-volatile memory coupled to and accessible by the control logic, the non-volatile memory configured to store vectors for each of the cores, the vectors indicative of which subunits have enabled functional performance variation at different voltages of operation.

In some examples, the vector may further be indicative of which subunits have enabled functional performance variation at a particular temperature.

In some examples, the voltage of operation may further correspond to a frequency at which the plurality of cores are configured to operate responsive to receipt of the voltage of operation.

In some examples, the multi-core processor may comprise a homogenous multi-core processor.

In yet another example, a system is provided. The system may include a multi-core processor including a storage unit configured to store data indicative of whether functional performance variation is enabled for subunits of cores of the multi-core processor at multiple voltages. The system may further include a module coupled to the memory and configured to provide a voltage of operation from amongst the multiple voltages to the multi-core processor and wherein the module is configured to assign instructions to the cores of the multi-core processor in accordance with the data stored in the storage unit.

In some examples, the module may further be configured to characterize a workload including identification of one or more subunits utilized by individual ones of the instructions included in the workload.

In some examples, the module may be configured to characterize the workload at least in part by determination of a type of instructions included in the workload and further may be configured to assign a weight to the instructions based on the type of the instructions.

In some examples, whether functional performance variation is enabled for certain cores may be based on temperature.

In some examples, the module may be configured to assign an affinity for certain cores to individual ones of the instructions.

In some examples, the module may comprise a hypervisor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

DETAILED DESCRIPTION

Figure 1:
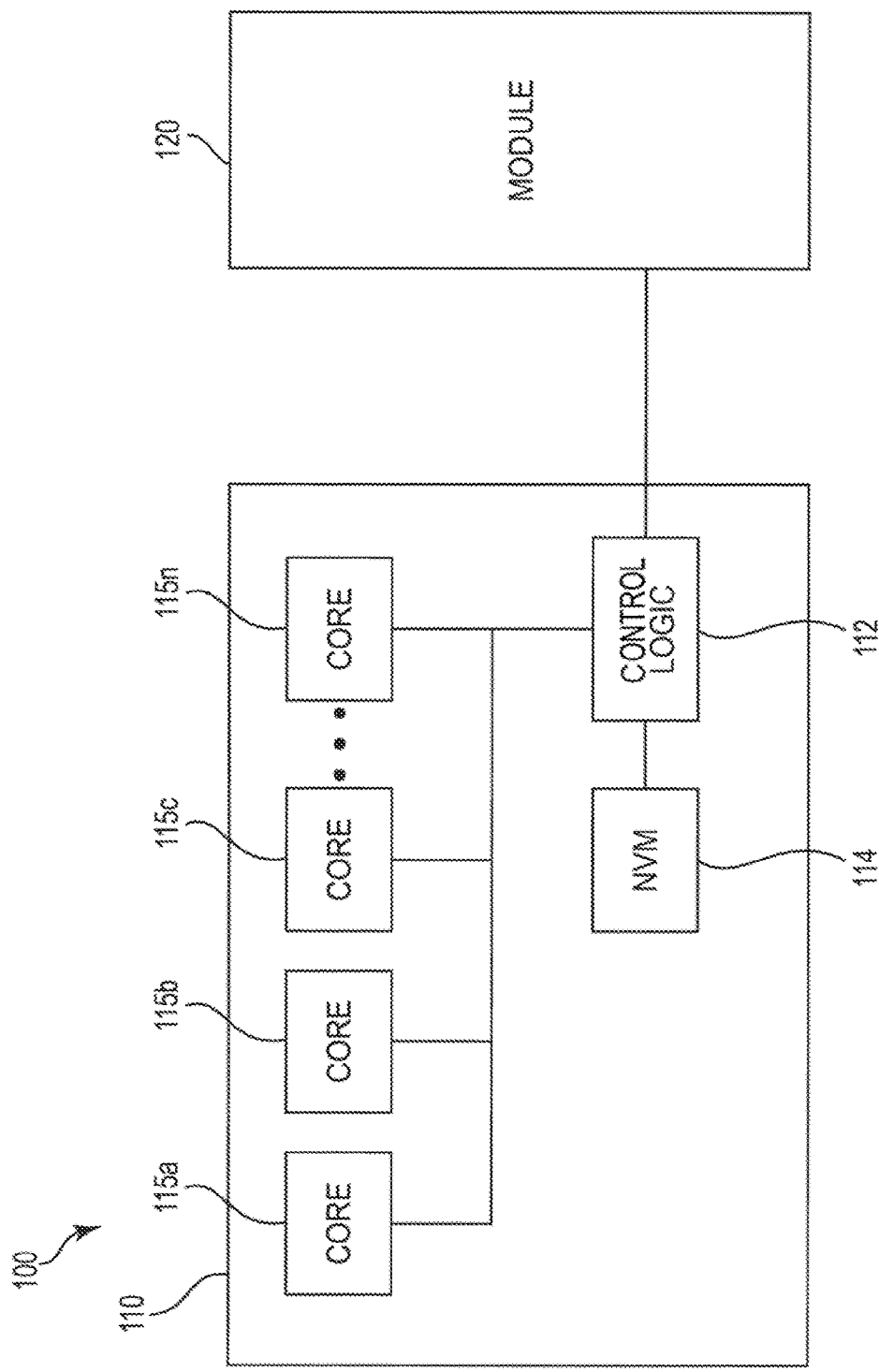
FIG. 1 is a block diagram of an example system, arranged in accordance with at least some embodiments described herein.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatuses generally related to instruction optimization (or otherwise improved execution of instructions) using voltage-based functional performance variation.

Briefly stated, some example methods include characterizing a workload for a multi-core processor to identify one or more subunits of individual cores of the multi-core processor for utilization by instructions included in the workload. Example methods may further include selecting a voltage at which to operate the cores of the multi-core processor. Example methods may further include assigning individual ones of the instructions of the workload to a core of the cores of the multi-core processor based on performance of the identified one or more subunits of the individual cores at the selected voltage.

FIG. 1 is a block diagram of an example system 100, arranged in accordance with at least some embodiments described herein. FIG. 1 shows multi-core processor 110 and module 120. The multi-core processor 110 may include control logic 112, a non-volatile memory 114, and a plurality of cores 115a-n (generally the "cores 115" or "core 115"). The various components described in FIG. 1 are merely examples, and other variations, including eliminating components, combining components, adding components, and substituting components are all contemplated.

The control logic 112 may be coupled to each of the cores 115 and the non-volatile memory 114 and, generally, may manage operation of the multi-core processor 110. Specifically, the control logic 112 may provide instructions to each of the cores 115 and may be configured to perform other processor tasks, such as those as described further herein.

The module 120 may be coupled to the multi-core processor 110 and may include one or more hardware and/or software components of a computing device. The module 120 may include one or more storage devices, including volatile memory and/or non-volatile memory, which in turn may be encoded with instructions for an operating system and one or more applications for performing optimization (or otherwise improved execution) of instructions in accordance with described embodiments. In some examples, the module 120 may include a hypervisor. During operation, and as will be explained in more detail, the module 120 may provide tasks to the multi-core processor 110 for execution. A task may comprise a programming thread and/or one or more instructions associated with a workload. By way of example, a task may comprise several thousand (e.g., 10,000) instructions. The control logic 112 may provide instructions of tasks to one or more of the cores 115 as described. The control logic 112, for instance, may provide all instructions of a task to a single core 115, or may provide instructions of a task to multiple cores 115.

Each of the cores 115 may execute instructions provided by the control logic 112, and may include a plurality of subunits for executing the instructions. Each subunit may be dedicated to executing one or more particular types of instructions, such as instructions directed to floating point arithmetic or instructions directed to integer arithmetic. Each subunit may, for instance, comprise a floating point unit (FPU), an arithmetic logic unit (ALU), other type of subunit(s) or portions thereof, or a combination thereof. The plurality of cores 115 of the multi-core processor 110 may be homogenous or heterogeneous.

Instructions provided to the cores 115 by the control logic 112 may be provided in accordance with affinity based assignment. For example, each instruction may be assigned an "affinity" for a specified core 115, indicating a preference for the instruction to be executed by the specified core 115. The module 120 may assign affinities to instructions at a task level, or at an instruction level, and may implement affinity based assignment using phase-based characterization, instruction census, lookahead and/or any other affinity based assignment methodology. While the module 120 may assign affinities to any number of instructions, the control logic 112 may selectively ignore affinities, for instance, based on available resources, and/or instruction type.

Each core 115 may operate in accordance with each of a plurality of voltage-frequency pairs. For example, each core 115 may operate at each of a plurality of voltages, and for each voltage, may further operate at a particular frequency associated with the voltage. For instance, the core 115a may operate at a plurality of different voltages, with a frequency of operation associated with each voltage. Moreover, a voltage at which cores 115 operate may be commanded by the module 120. In response, each core 115 may identify a frequency associated with the commanded voltage and operate at the identified frequency. In other examples, both the voltage and the frequency may be commanded by the module 120. By adjusting the voltage and frequency in this manner, processing efficiency may generally be improved.

In some instances, one or more subunits of a core 115 may not correctly operate at a commanded frequency of the core 115. Particular subunits of a core 115, for example, may require a lower frequency for proper operation. Accordingly, the core 115 may selectively enable functional performance variation for each subunit. Enabling functional performance variation for a subunit may include reducing the frequency (e.g., clock frequency) by which the subunit operates. Reducing frequency in this manner may include reducing frequency by half, or by any other factor. Additionally or alternatively, functional performance variation may be selectively enabled based on temperature and/or voltage of cores 115. For example, subunits of cores 115 may operate differently based on temperature and frequencies by which subunits operate may be adjusted to help ensure that each subunit operates properly.

In accordance with one or more of the embodiments described herein, during operation, each of the cores 115 may provide data indicating for which subunits functional performance variation is enabled. For the purposes of description herein, data provided by cores 115 in this manner may be indicative of the "performance" of a core 115 and accordingly is referred to as "performance data." Performance data provided by cores 115 may be provided to the control logic 112 and further may be provided in vector form. By way of example, each element of a performance data vector may indicate whether a subunit associated with the element is operating in accordance with functional performance variation. In some examples, each element may indicate whether functional performance variation is enabled for a subunit by specifying a binary value (e.g., a binary 1 may indicate functional performance variation is enabled) and/or may indicate a frequency of operation of the subunit. Additionally or alternatively, each element may indicate a number of instructions completed by a subunit per clock cycle of a master clock.

Figure 4:
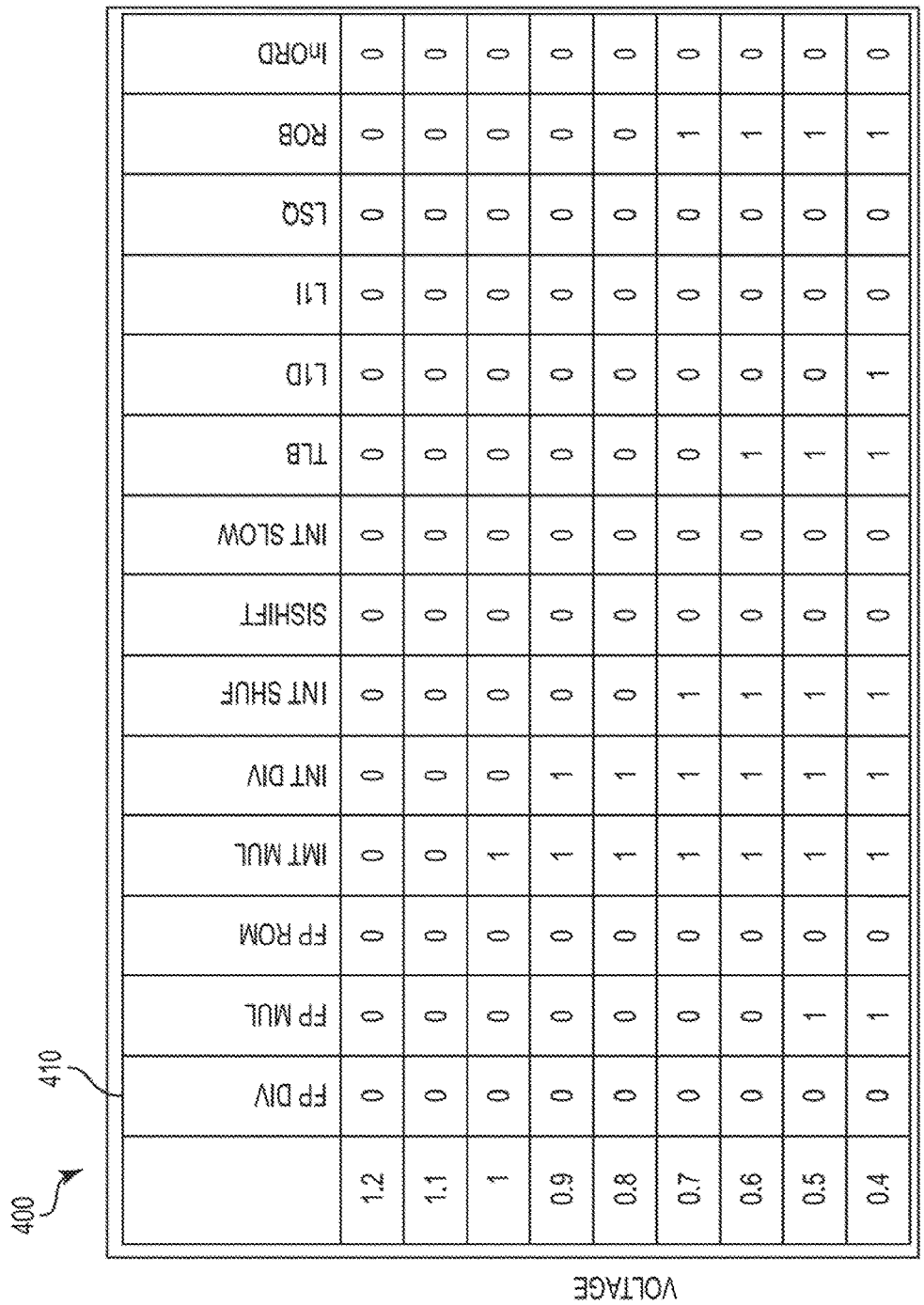
FIG. 4 is a diagram illustrating an example data structure indicative of example functional performance variation of a core at multiple voltages.

To generate performance data, each core 115 of the multi-core processor 110 may operate at each of multiple voltages, and in response provide performance data corresponding to each of the multiple voltages. For each core 115, the performance data at each voltage may be placed into a data structure, such as a table, linked list, or array. With reference to FIG. 4, an example data structure 400 is illustrated for a core 115, indicating performance functional variation of each subunit of the core 115 at each of multiple voltages. In at least one example, performance data may be associated with a particular temperature or temperature range. For example, a core 115 may operate at multiple voltages for each of a plurality of temperature ranges such that performance data is provided for each operating voltage at each temperature.

Performance data may be generated during a manufacturing process of the multi-core processor 110 or during an initial operation of the multi-core processor 110. The control logic 112 may, for example, receive performance data for each core 115, and store the performance data for subsequent reference in the non-volatile memory 114, volatile memory of the module 120, and/or non-volatile memory of the module 120. Additionally or alternatively, performance data may be provided from each of the cores 115 in real-time during operation of the multi-core processor 110. In this manner, functional performance variation may be tracked during operation as voltages and/or temperatures fluctuate.

During operation, performance data may be used by the module 120 to assign an affinity to one or more instructions based on the performance data. The module 120 may, for instance, use the performance data to determine which individual core or plurality of cores 115 is best suited to execute a particular instruction and assign an affinity to the instruction accordingly. In this manner, execution of instructions using the cores 115 may be optimized or otherwise improved. By way of example, a first core 115a operating with a half-clocked floating point ALU may be less efficient executing floating point arithmetic instructions, and the module 120 may prefer that a second core 115b operating with a fully-clocked floating point ALU execute the floating point arithmetic instructions. The module 120 may assign an affinity to the floating point arithmetic instructions for the second core 15b. In some examples, the module 120 may receive performance data in real-time and assign affinities to instructions using performance data received in real-time. In other examples, the module 120 may store performance data, e.g., on a non-volatile memory of the module 120, for subsequent reference.

Figure 2:
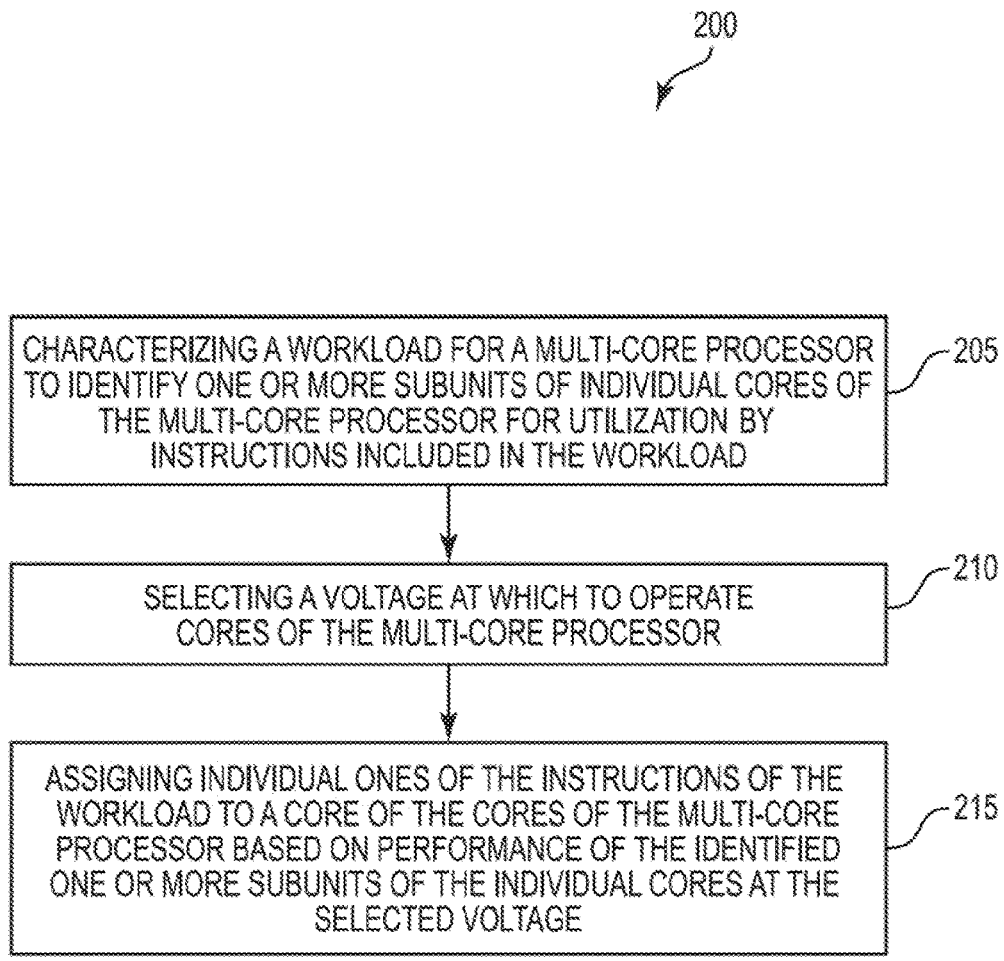
FIG. 2 is a flow chart illustrating an example method to assign instructions in a multi-core processor, arranged in accordance with at least some embodiments described herein.

FIG. 2 is a flow chart illustrating an example method 200 to assign instructions in a multi-core processor, arranged in accordance with at least some embodiments described herein. An example method may include one or more operations, functions or actions as illustrated by one or more of blocks 205, 210, and/or 215. The operations described in the blocks 205-215 may be performed in response to execution (such as by one or more processors described herein) of computer-executable instructions stored in a non-transitory computer-readable medium, such as a computer-readable medium of a computing device or some other controller or device similarly configured.

An example process may begin with block 205, which may include "characterizing a workload for a multi-core processor to identify one or more subunits of individual cores of the multi-core processor for utilization by instructions included in the workload." Block 205 may be followed by block 210, which may include "selecting a voltage at which to operate the cores of the multi-core processor." Block 210 may be followed by block 215, which may include "assigning individual ones of the instructions of the workload to a core of the cores of the multi-core processor based on performance of the identified one or more subunits of the individual cores at the selected voltage."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, block 210 may be performed prior to block 205.

Block 205 may include "characterizing a workload for a multi-core processor to identify one or more subunits of individual cores of the multi-core processor for utilization by instructions included in the workload." The module 120 may identify a workload, for instance, provided to or stored in the module 120, for the multi-core processor 110. The module 120 may characterize the workload to identify instructions in the workload as well as a type of each identified instruction and/or subunits utilized by each identified instruction. As an example, instructions may be identified as being directed to floating point arithmetic (e.g., addition, subtraction, multiplication, division) or directed to integer arithmetic. In some instances, characterizing a workload may further include assigning a weight to each instruction type. The weight may, for instance, indicate the frequency of each instruction type relative to other instruction types within the workload. The weight of each instruction type may then be weighted against performance data of each core 115 to determine which core 115 is best suited to perform each instruction and/or one or more tasks including the instructions.

Block 210 may include "selecting a voltage at which to operate cores of the multi-core processor." The module 120 may select a voltage of operation for the cores 115 of the multi-core processor 110. As described, this voltage may be commanded to each of the cores 115 such that each of the cores 115 may operate according to a voltage-frequency pair. In at least one embodiment, a voltage may be selected to optimize (or otherwise improve) execution of the instructions identified in the workload. For example, if a workload includes a relatively larger number of instructions directed to integer arithmetic, the module 120 may command a voltage to cores 115 of the multi-core processor 110 resulting in the greatest overall efficiency of executing instructions directed to integer arithmetic.

Block 215 may include "assigning individual ones of the instructions of the workload to a core of the cores of the multi-core processor based on performance of the identified one or more subunits of the individual cores at the selected voltage." For example, the module 120 may assign an affinity to each of the instructions for a particular core 115 in accordance with the workload characterized at block 205 and the voltage selected at block 210. The instructions may subsequently be provided to the control logic 112 for execution on the cores 115. As described, the control logic 112 may selectively ignore affinities assigned to the instructions.

Figure 3:
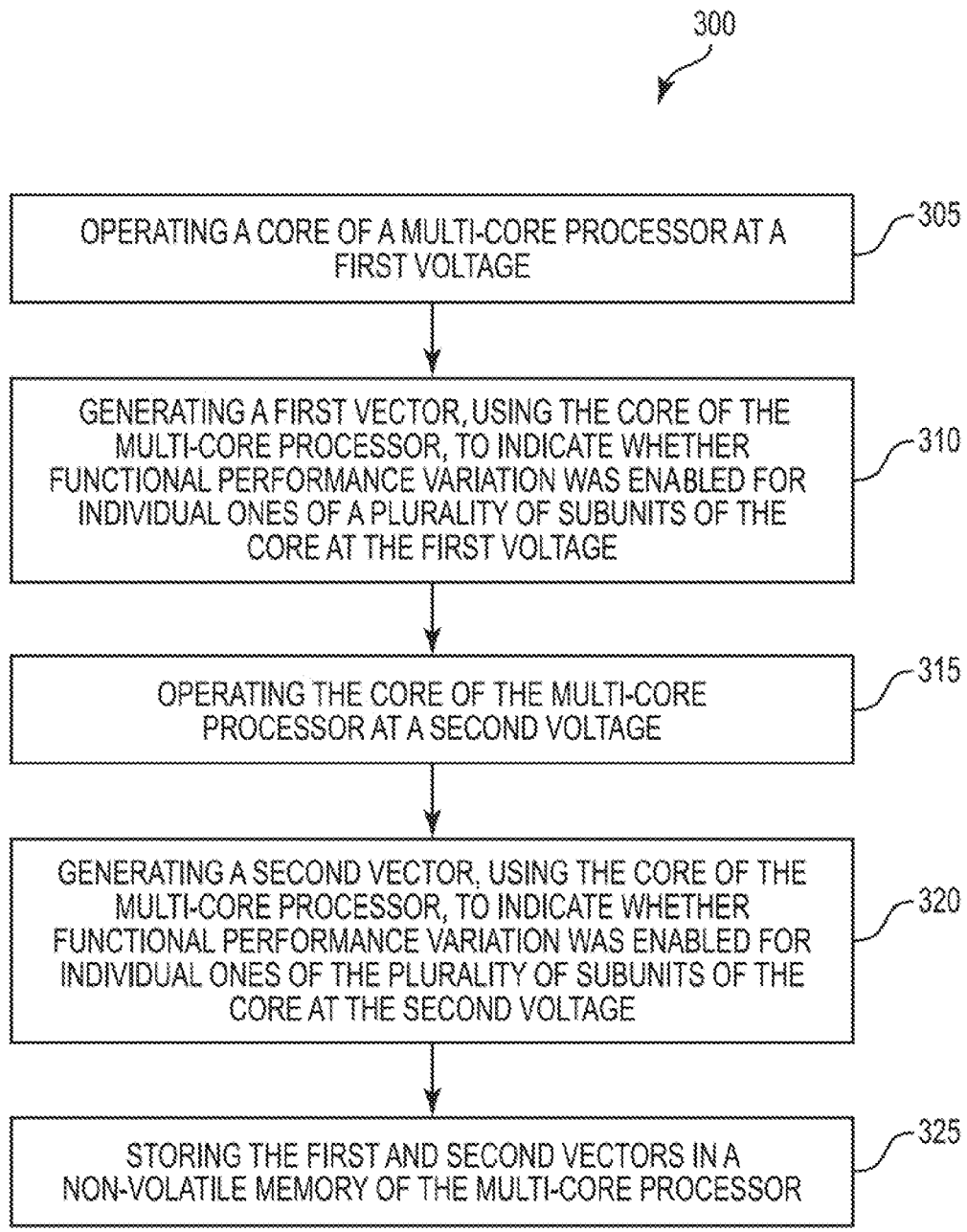
FIG. 3 is a flow chart illustrating an example method to determine instruction affinity of a multi-core processor, arranged in accordance with at least some embodiments described herein.

FIG. 3 is a flow chart illustrating an example method 300 to determine instruction affinity of a multi-core processor, arranged in accordance with at least some embodiments described herein. An example method may include one or more operations, functions or actions as illustrated by one or more of blocks 305, 310, 315, 320, and/or 325. The operations described in the blocks 305-325 may be performed in response to execution (such as by one or more processors described herein) of computer-executable instructions stored in a computer-readable medium, such as a non-transitory computer-readable medium of a computing device or some other controller or device similarly configured.

An example process may begin with block 305, which may include "operating a core of a multi-core processor at a first voltage." Block 305 may be followed by block 310, which may include "generating a first vector, using the core of the multi-core processor, to indicate whether functional performance variation was enabled for individual ones of a plurality of subunits of the core at the first voltage." Block 310 may be followed by block 315, which may include "operating the core of the multi-core processor at a second voltage." Block 315 may be followed by block 320, which may include "generating a second vector, using the core of the multi-core processor, to indicate whether functional performance variation was enabled for the individual ones of the plurality of subunits of the core at the second voltage." Block 320 may be followed by block 325, which may include "storing the first and second vectors in a non-volatile memory associated with the multi-core processor."

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. By way of example, the first vector may be stored in the non-volatile memory prior to generating the second vector at block at block 320.

Block 305 may include "operating a core of a multi-core processor at a first voltage." A core 115, such as the core 115a, of the multi-core processor 110 may be operated at a first voltage. As described, the voltage may be commanded by the module 120 or the control logic 112. In response to the first voltage, the core 115 may operate in accordance with a corresponding voltage-frequency pair. Because subunits of the core 115 may not operate properly at the voltage-frequency pair, the core 115 may selectively enable functional performance variation for one or more of the subunits.

Block 310 may include "generating a first vector, using the core of the multi-core processor, to indicate whether functional performance variation was enabled for individual ones of a plurality of subunits of the core at the first voltage." While operating at the first voltage, the core 115 may provide performance data indicating for which subunits functional performance variation is enabled. The performance data may be provided in vector form and/or further may indicate a binary value indicating whether functional performance variation is enabled for each subunit. The performance data may be provided from each core 115 to the control logic 112.

Block 315 may include "operating the core of the multi-core processor at a second voltage." The core 115 of the multi-core processor 110 may be operated at a second voltage. As described, the voltage may be commanded by the module 120 or the control logic 112. In response to the second voltage, the core 115 may operate in accordance with a corresponding voltage-frequency pair. Because subunits of the core 115 may not operate properly at the voltage-frequency pair, the core 115 may selectively enable functional performance variation for one or more of the subunits.

Block 320 may include "generating a second vector, using the core of the multi-core processor, to indicate whether functional performance variation was enabled for the individual ones of the plurality of subunits of the core at the second voltage." While operating at the second voltage, the core 115 may provide performance data indicating for which subunits functional performance variation is enabled. The performance data may be provided in vector form and/or further may indicate a binary value indicating whether functional performance variation is enabled for each subunit. The performance data may be provided from each core 115 to the control logic 112.

Block 325 may include "storing the first and second vectors in a non-volatile memory associated with the multi-core processor." After the control logic 112 receives both the first and second vectors from the core 115 at each voltage, the control logic 112 may store the vectors in a non-volatile memory, such as the non-volatile memory 114 of the multi-core processor 110 or a non-volatile memory of the module 120. As described, the vectors may be stored in a data structure, such as a table.

While the method 300 has been described with respect to a particular core 115, it will be appreciated that the method 300 may be performed on multiple cores simultaneously such that a vector is provided by each core 115 for each voltage of operation. Moreover, cores 115 may be operated at any number of voltages and/or may be operated at a same voltage any number of times at different temperatures.

FIG. 4 is a diagram illustrating an example data structure 400 indicative of functional performance variation of a core at multiple voltages. As described, the data structure 400 may indicate for which subunits 410 functional performance variation is enabled at each voltage.

Subunits 410 may include a floating point division subunit (FP DIV), a floating point multiplication subunit (FP MUL), a floating point ROM subunit (FP ROM), an integer multiplication subunit (INT MUL), an integer division subunit (INT DIV), an integer shuffle subunit (INT SHUF), a signed integer shift subunit (SISHIFT), an integer slow subunit (INT SLOW), a translation lookaside buffer subunit (TLB), a level-1 data cache subunit (LID), a level-1 instruction cache subunit (LII), a load-store queue subunit (LSQ), a reorder buffer subunit (ROB), and an in-order subunit (In-ORD). Any combination of these and/or other subunits may be used in each of the cores 115.

As described, functional performance variation may include adjusting the frequency by which one or more subunits 410 operate. With reference to FIG. 4, a binary "1" may indicate enablement of functional performance variation for a subunit 410 and a binary "0" may indicate no enablement of functional performance variation for a subunit 410. Taking a voltage of 0.8V as an example, functional performance variation of a core 115 may, for instance, be enabled for an INT MUL subunit and an INT DIV subunit.

Figure 5:
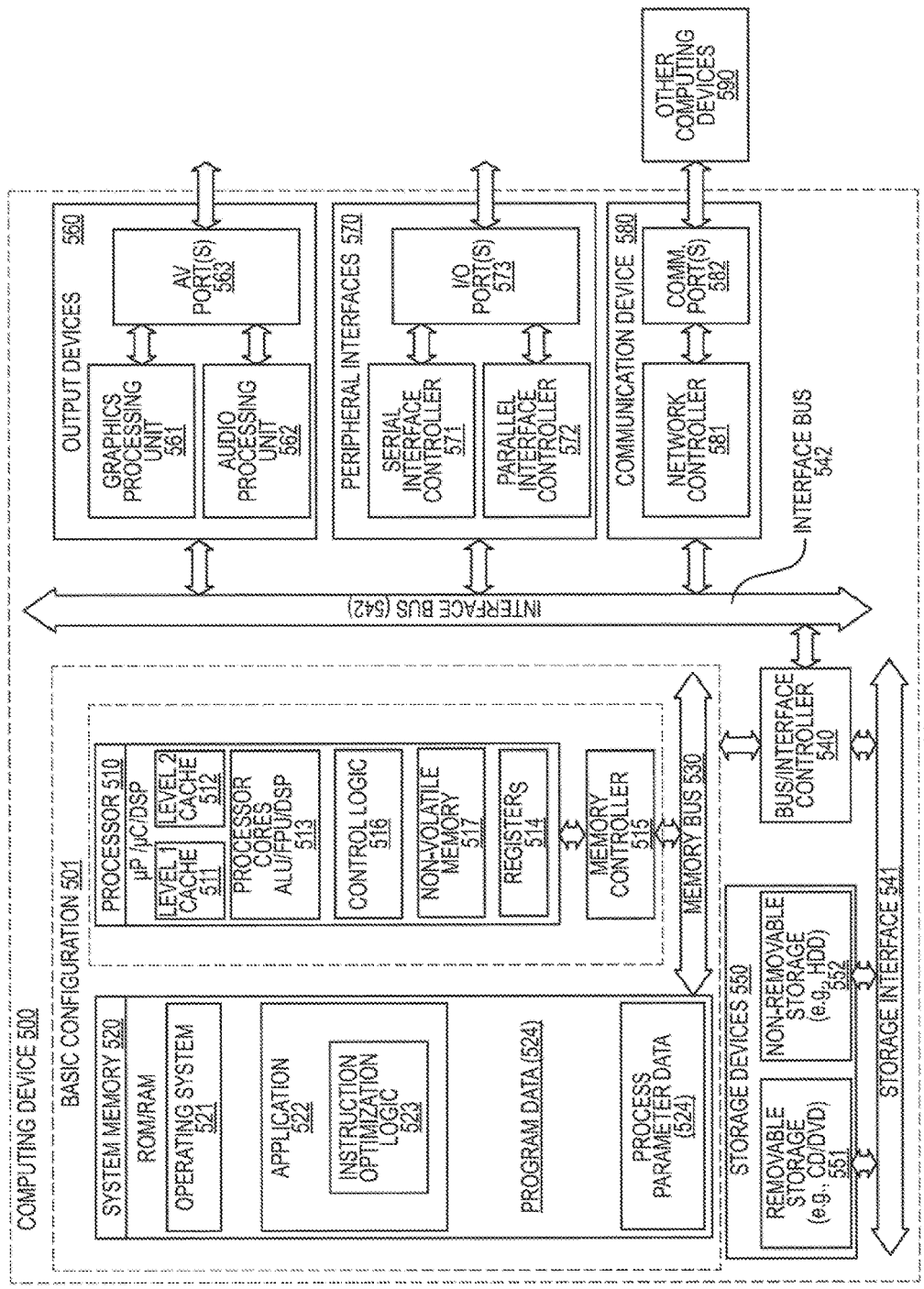
FIG. 5 is a block diagram illustrating an example computing device that is arranged for instruction optimization using voltage-based functional performance variation in accordance with at least some embodiments described herein.

FIG. 5 is a block diagram illustrating an example computing device that is arranged for instruction optimization (or otherwise improved execution of instructions) using voltage-based functional performance variation in accordance with at least some embodiments described herein. In a very basic configuration 501, computing device 500 typically includes one or more processors 510 and system memory 520. A memory bus 530 may be used for communicating between the processor 510 and the system memory 520. The processor 510 of one embodiment may correspond to the multi-core processor 110 of FIG. 1.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, processor cores 513, registers 514, control logic 516, and non-volatile memory 517. The processor cores 513 of one embodiment may correspond to the cores 115 of FIG. 1. An example processor core 513 may include an arithmetic logic unit (ALU), a floating point unit (FPU), a digital signal processing core (DSP core), or any combination thereof. The control logic 516 of one embodiment may correspond to the control logic 112 of FIG. 1. The non-volatile memory 517 of one embodiment may correspond to the non-volatile memory 114 of FIG. 1. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include instruction optimization logic 523 that is arranged to optimize instructions based on performance data as described herein. Accordingly, the system memory 520 of one embodiment may correspond to the module 120. Program data 524 may include performance data, and/or other information useful for the implementation of instruction optimization logic 523. In some embodiments, application 522 may be arranged to operate with program data 524 on an operating system 521 such that any of the procedures described herein may be performed. This described basic configuration is illustrated in FIG. 5 by those components within dashed line of the basic configuration 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more storage devices 550 via a storage interface bus 541. The storage devices 550 may be removable storage devices 551, non-removable storage devices 552, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

Figure 6:
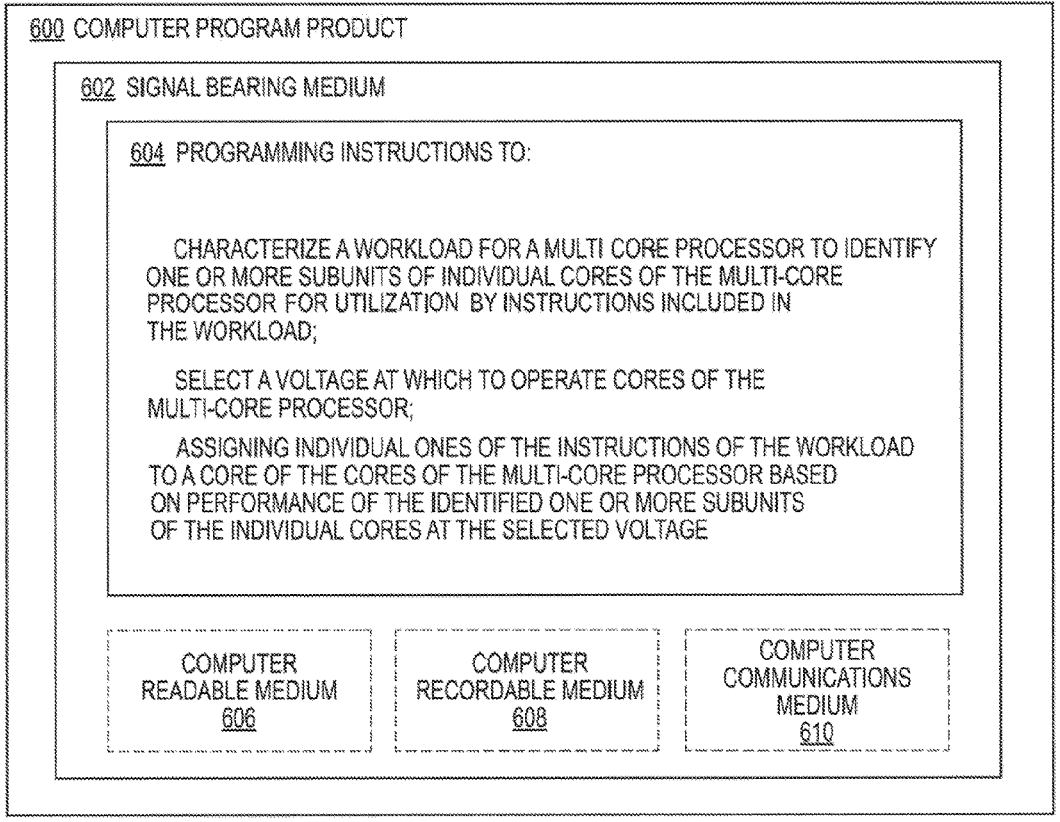
FIG. 6 is a block diagram illustrating an example computer program product that is arranged to store instructions for instruction optimization using voltage-based functional performance variation in accordance with at least some embodiments described herein.

FIG. 6 is a block diagram illustrating an example computer program product that is arranged to store instructions for instruction optimization using voltage-based functional performance variation in accordance with at least some embodiments described herein. The signal bearing medium 602 which may be implemented as or include a computer-readable medium 606, a computer recordable medium 608, a computer communications medium 610, or combinations thereof, stores programming instructions 604 that may configure the processing unit to perform all or some of the processes previously described. These instructions may include, for example, one or more executable instructions to characterize a workload for a multi-core processor to identify one or more subunits of individual cores of the multi-core processor for utilization by instructions included in the workload, select a voltage at which to operate cores of the multi-core processor, and assigning individual ones of the instructions of the workload to a core of the cores of the multi-core processor based on performance of the identified one or more subunits of the individual cores at the selected voltage.

The present disclosure is not to be limited in terms of the particular examples described in this application, which are intended as illustrations of various aspects. Many modifications and examples can be made without departing from its spirit and scope. Functionally equivalent methods and apparatuses within the scope of the disclosure, in addition to those enumerated herein, are possible from the foregoing descriptions. Such modifications and examples are intended to fall within the scope of the appended claims. The present disclosure is to be limited only by the terms of the appended claims, along with the full scope of equivalents to which such claims are entitled. This disclosure is not limited to particular methods, reagents, compounds compositions or biological systems, which can, of course, vary. The terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least." "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, and such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be possible in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. Such depicted architectures are merely examples, and in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples are possible. The various aspects and examples disclosed herein are for purposes of illustration and are not intended to be limiting, with the true scope and spirit being indicated by the following claims.

What is claimed is:

1. A method, comprising:
   characterizing a workload for a multi-core processor, wherein characterizing the workload includes:
   identifying instructions included in the workload;
   identifying one of more subunits of individual cores of the multi-core processor for utilization by the instructions included in the workload;
   identifying an instruction type of each instruction included in the workload; and
   assigning a weight to each instruction type based on a frequency of the instruction type relative to other instruction types in the workload;
   selecting a voltage at which to operate the individual cores of the multi-core processor; and
   assigning individual ones of the instructions of the workload to a core, of the individual cores, based on the characterized workload and performance of the one or more subunits of the individual cores at the selected voltage.

2. The method of claim 1, further comprising reading, from a non-volatile memory accessible to the multi-core processor, data indicative of the performance of the one or more subunits of the individual cores at the selected voltage.

3. The method of claim 2, wherein reading the data indicative of the performance of the one or more subunits of the individual cores at the selected voltage comprises reading data indicative of whether functional performance variation is enabled for the one or more subunits of the individual cores at the selected voltage.

4. The method of claim 3, wherein reading the data indicative of whether the functional performance variation is enabled for the one or more subunits of the individual cores at the selected voltage comprises reading data indicative of a clock speed of certain subunits of the individual cores at the selected voltage.

5. A method, comprising:
   operating, at a first voltage, a core of a multi-core processor;
   generating a first vector, using the core of the multi-core processor, to indicate whether functional performance variation was enabled, at the first voltage, for individual ones of a plurality of subunits of the core, wherein generating the first vector includes generating a vector that includes a plurality of binary values, and wherein each of the plurality of binary values is indicative of whether the functional performance variation was enabled for a respective subunit of the plurality of subunits of the core;
   operating, at a second voltage, the core of the multi-core processor;
   generating a second vector, using the core of the multi-core processor, to indicate whether functional performance variation was enabled, at the second voltage, for the individual ones of the plurality of subunits of the core; and
   storing the first vector and the second vector in a non-volatile memory associated with the multi-core processor,
   wherein the enabled functional performance variation of a particular subunit, of the plurality of subunits of the core, is indicative of an adjustment in a frequency by which the particular subunit operates, and wherein the adjustment in the frequency is relative to an operating frequency of the core.

6. The method of claim 5, wherein storing the first vector and the second vector in the non-volatile memory associated with the multi-core processor comprises storing the first vector and the second vector in a data structure.

7. The method of claim 5, wherein storing the first vector and the second vector in the non-volatile memory associated with the multi-core processor comprises storing a clock speed of the individual ones of the plurality of subunits of the core.

8. The method of claim 5, wherein storing the first vector and the second vector in the non-volatile memory associated with the multi-core processor comprises storing a table that comprises the first vector and the second vector.

9. The method of claim 5, wherein generating the first vector, using the core of the multi-core processor, to indicate whether the functional performance variation was enabled, at the first voltage, for the individual ones of the plurality of subunits of the core comprises generating the first vector to indicate whether the functional performance variation was enabled, at the first voltage and at a first temperature, for the individual ones of the plurality of subunits of the core, and wherein the method further comprises:
   generating a third vector to indicate whether the functional performance variation was enabled, at the first voltage and at a second temperature, for the individual ones of the plurality of subunits of the core.

10. The method of claim 5, wherein:
    the first voltage corresponds to a first voltage-frequency pair,
    operating, at the first voltage, the core of the multi-core processor comprises operating the core at a frequency of the first voltage-frequency pair,
    the second voltage corresponds to a second voltage-frequency pair, and
    operating, at the second voltage, the core of the multi-core processor comprises operating the core at a frequency of the second voltage-frequency pair.

11. The method of claim 5, wherein generating the first vector includes generating a vector that includes a frequency.

12. A multi-core processor, comprising:
    a plurality of cores, wherein individual ones of the plurality of cores include subunits that are configured to be selectively enabled for functional performance variation based on a voltage of operation; and control logic coupled to the individual ones of the plurality of cores and configured to:
obtain the voltage of operation;
obtain, from a core of the plurality of cores, a vector indicative of which of the subunits have enabled the functional performance variation at the voltage of operation, wherein the enabled functional performance variation of a particular subunit, of the core, is indicative of an adjustment in a frequency by which the particular subunit operates, and wherein the adjustment in the frequency is relative to an operating frequency of the core; and
assign individual ones of a plurality of instructions to the plurality of cores, wherein the individual ones of the plurality of instructions include an affinity for one or more cores, of the plurality of cores, based on the vector.

13. The multi-core processor of claim 12, further comprising:
a non-volatile memory coupled to and accessible by the control logic, wherein the non-volatile memory is configured to store vectors for each of the plurality of cores, and wherein the vectors are indicative of which of the subunits have enabled functional performance variation at different voltages of operation.

14. The multi-core processor of claim 12, wherein the vector is further indicative of which subunits have enabled functional performance variation at a particular temperature.

15. The multi-core processor of claim 12, wherein the voltage of operation corresponds to a frequency at which the plurality of cores are configured to operate responsive to the voltage of operation being obtained.

16. The multi-core processor of claim 12, wherein the multi-core processor comprises a homogenous multi-core processor.

17. A system, comprising:
a multi-core processor that includes a storage unit configured to store data indicative of whether functional performance variation is enabled, at multiple voltages, for subunits of cores of the multi-core processor; and
a module coupled to the storage unit and configured to:
provide a voltage of operation, from amongst the multiple voltages, to the multi-core processor;
assign instructions, of a workload, to the cores of the multi-core processor in accordance with the data stored in the storage unit; and
selectively enable the functional performance variation for at least one subunit of a core of the multi-core processor,
wherein to selectively enable the functional performance variation for the at least one subunit of the core, the module is configured to adjust a frequency by which the subunit operates, and wherein the adjustment in the frequency is relative to an operating frequency of the core.

18. The system of claim 17, wherein the module is further configured to characterize the workload, and wherein the characterization of the workload includes identification of one or more subunits utilized by individual ones of the instructions, which are included in the workload.

19. The system of claim 18, wherein the module is configured to characterize the workload at least, in part, by determination of respective types of the instructions included in the workload, and wherein the module is further configured to assign respective weights to the instructions based on the respective types of the instructions.

20. The system of claim 17, wherein functional performance variation is enabled for certain cores of the multi-core processor based on temperature.

21. The system of claim 17, wherein the module is configured to assign an affinity for certain cores of the multi-core processor to individual ones of the instructions.

22. The system of claim 17, wherein the module comprises a hypervisor.

23. The system of claim 17, wherein the module is further configured to:
identify an instruction type of each instruction of the workload; and
assign a weight to each instruction type based on a frequency of the instruction type relative to other instruction types in the workload.

24. A method, comprising:
characterizing a workload for a multi-core processor to identify one or more subunits of individual cores of the multi-core processor for utilization by instructions included in the workload;
selecting, from a plurality of voltages, a voltage at which to operate the individual cores of the multi-core processor;
reading functional performance variation data indicative of whether functional performance variation is enabled, for the one or more subunits of the individual cores, wherein the functional performance variation data corresponds to the plurality of voltages, and wherein the enabled functional performance variation of a particular subunit is indicative of an adjustment in a frequency by which the particular subunit operates, and wherein the adjustment in the frequency is relative to an operating frequency of a core that includes the particular subunit;
determining, based on the functional performance variation data, performance of the one or more subunits of the individual cores at the selected voltage; and
assigning individual ones of the instructions included in the workload to a core, of the individual cores, based on the determined performance of the one or more subunits of the individual cores at the selected voltage.

* * * * *